US009923468B2

(12) United States Patent
Paul et al.

(10) Patent No.: US 9,923,468 B2
(45) Date of Patent: Mar. 20, 2018

(54) MULTIPHASE POWER CONVERSION USING SKEWED PER-PHASE INDUCTOR CURRENT LIMITS

(71) Applicant: Apple Inc., Cupertino, CA (US)

(72) Inventors: Rajarshi Paul, Fremont, CA (US); Parin Patel, San Francisco, CA (US); Talbott M. Houk, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 14/675,455

(22) Filed: Mar. 31, 2015

(65) Prior Publication Data

US 2015/0288285 A1    Oct. 8, 2015

Related U.S. Application Data

(60) Provisional application No. 61/974,374, filed on Apr. 2, 2014.

(51) Int. Cl.
*H02M 3/158* (2006.01)
*H02M 1/40* (2007.01)
*H02M 1/00* (2006.01)
*H02M 3/156* (2006.01)

(52) U.S. Cl.
CPC ......... *H02M 3/1584* (2013.01); *H02M 3/158* (2013.01); *H02M 1/40* (2013.01); *H02M 2001/0025* (2013.01); *H02M 2001/0032* (2013.01); *H02M 2003/1566* (2013.01); *Y02B 70/16* (2013.01)

(58) Field of Classification Search
CPC . H02M 3/1584; H02M 3/1586; H02M 3/1566
See application file for complete search history.

(56) References Cited

U.S. PATENT DOCUMENTS

| 6,683,441 B2 | 1/2004 | Schiff et al. |
| 7,109,691 B2 | 9/2006 | Brooks et al. |
| 8,344,712 B2 * | 1/2013 | Martin .................. H02M 3/157 323/222 |
| 2002/0180410 A1 | 12/2002 | Brooks |
| 2008/0084717 A1 | 4/2008 | Wu et al. |

(Continued)

FOREIGN PATENT DOCUMENTS

EP    2096745 A1    9/2009

OTHER PUBLICATIONS

"An Introduction to Switch-Mode Power Supplies", Application Note 4087, Sep. 27, 2007, Maxim Integrated™, (6 pages).

(Continued)

*Primary Examiner* — Timothy J Dole
*Assistant Examiner* — Ishrat Jamali
(74) *Attorney, Agent, or Firm* — Blank Rome LLP (57) ABSTRACT

A power conversion circuit has multiple phases wherein each of the phases has an inductor coupled to a power switch circuit and is coupled to an output node. A power conversion controller controls the switching of one or more of the phases to yield a regulated voltage on the output node. The controller uses a variable inductor current limit for one or more designated phases, and temporarily increases the variable inductor current limit during a transient condition. Other embodiments are also described and claimed.

21 Claims, 6 Drawing Sheets

(56) References Cited

U.S. PATENT DOCUMENTS

2011/0062929 A1\* 3/2011 Strydom ............... H02M 3/158
                                                    323/284
2011/0148200 A1\* 6/2011 Burns .................... H02M 1/32
                                                    307/43

OTHER PUBLICATIONS

"Discrete Narrow-Band Switching Frequency Avoidance of a Switch Mode Power Converter", U.S. Appl. No. 13/905,506, filed May 30, 2013, First Named Inventor: Rajarshi Paul, (24 pages).
Dale, Vishay, "Inductor and Magnetic Product Terminology", Definitions, VISHAY®, Document No. 34053, Revision: Mar. 6, 2002, (7 pages).
Dixon, Lloyd, "Average Current Mode Control of Switching Power Supplies", Unitrode, U-140, Application Note, Unitrode Corporation, Merrimack, NH, © 1999, Texas Instruments Incorporated, (15 pages).
Khan, M. Z., et al., "High Efficiency Interleaved Bi-Directional ZVS DC-DC Converter", Journal of Physics: Conference Series 439 (2013), 6th Vacuum and Surface Sciences Conference of Asia and Australia (VASSCAA-6), DOI: 10.1088/1742-6596/439/1/012032, (13 pages).
Zhang, Xu, et al., "Digitally Controlled Distributed Multiphase DC-DC Converters", Colorado Power Electronics Center, ECEE Department, University of Colorado at Boulder, 978-1-4244-2893-9/09 ©2009 IEEE, (pp. 36-42).

\* cited by examiner

FIG. 5

MULTIPHASE POWER CONVERSION USING SKEWED PER-PHASE INDUCTOR CURRENT LIMITS

This non-provisional application claims the benefit of the earlier filing date of provisional application No. 61/974,374 filed Apr. 2, 2014.

FIELD

An embodiment of the invention relates to switch mode multi-phase dc-dc voltage regulator circuits used in portable consumer electronic devices. Other embodiments are also described.

BACKGROUND

Output voltage regulation and maintaining the accuracy of the regulated voltage provided by a switch mode power converter can be a very demanding task. For example, in the field of multi-function portable consumer electronic devices (also referred to here as mobile devices, such as smartphones, tablet computers, and laptop computers) the power requirements of the constituent components such as the display screen, the wireless communications interface, the audio subsystem, and the system on a chip (SoC) or applications processor are quite demanding. For example, in such devices, the load on an output node of a voltage regulator can exhibit sudden changes that are so great, e.g. as fast as 100 Amperes-1000 Amperes per microsecond, that the output node exhibits significant transient voltage drop. Attempts at reducing the transient voltage drop by the conventional approach of simply using larger capacity and higher performance decoupling and/or filter capacitors may not be practical in many instances.

SUMMARY

An embodiment of the invention is a multi-phase switching power conversion circuit that may exhibit improved transient response, i.e. smaller transient voltage drop. The circuit has a number of phases coupled to an output node, wherein each of the phases has an inductor coupled to a power switch circuit. A controller is coupled to control the switching of the phases in order to yield a regulated voltage on the output node. One or more of the phases are deemed to be designated phases, in that the controller is to use a variable inductor current limit for such phases. In other words, the phases may have what are referred to here as skewed inductor current limits.

In one embodiment, the inductor of the designated phase (which is a phase that is controlled in accordance with the variable inductor current limit) has smaller inductance and higher saturation current than the inductor of another one of the phases. There may be more than one designated phase, and in one embodiment each of the designated phases has the lowest possible inductance that is practical in view of the maximum load current or output current specified for the power conversion circuit. This may lead to an additional benefit, namely lower physical space requirements for the inductors of the power conversion circuitry.

The power conversion circuit can respond more quickly to sudden and large load changes, by raising the inductor current limit of the designated phase and switching on the designated phase, to thereby enable the inductor current of the designated phase to increase much faster and reach a higher limit than the inductor current of another phase that has greater inductance, lower saturation current, and a lower inductor current limit. When the transient condition has passed, the inductor current limit of the designated phase is lowered and normal control of the switching of the phases may be resumed.

A multi-phase power conversion circuit that has one or more phases which have greater inductance than the designated phases helps maintain good efficiency when the load is light. Also, during light load conditions, some or all the designated phases (which have smaller inductance) may be kept inactive or switched off, while the phases that have larger inductance remain active and can more efficiently meet the needed voltage regulation. In such an embodiment, the designated (and smaller inductance) phases are activated only when the load exceeds some threshold or when the controller changes for example from a pulse frequency modulation (PFM) mode to a pulse width modulation (PWM) mode.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness, a given figure may be used to illustrate the features of more than one embodiment of the invention, or more than one species of the invention, and not all elements in the figure may be required for a given embodiment or species.

DETAILED DESCRIPTION

Several embodiments of the invention with reference to the appended drawings are now explained. Whenever aspects of the embodiments described here are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1A:
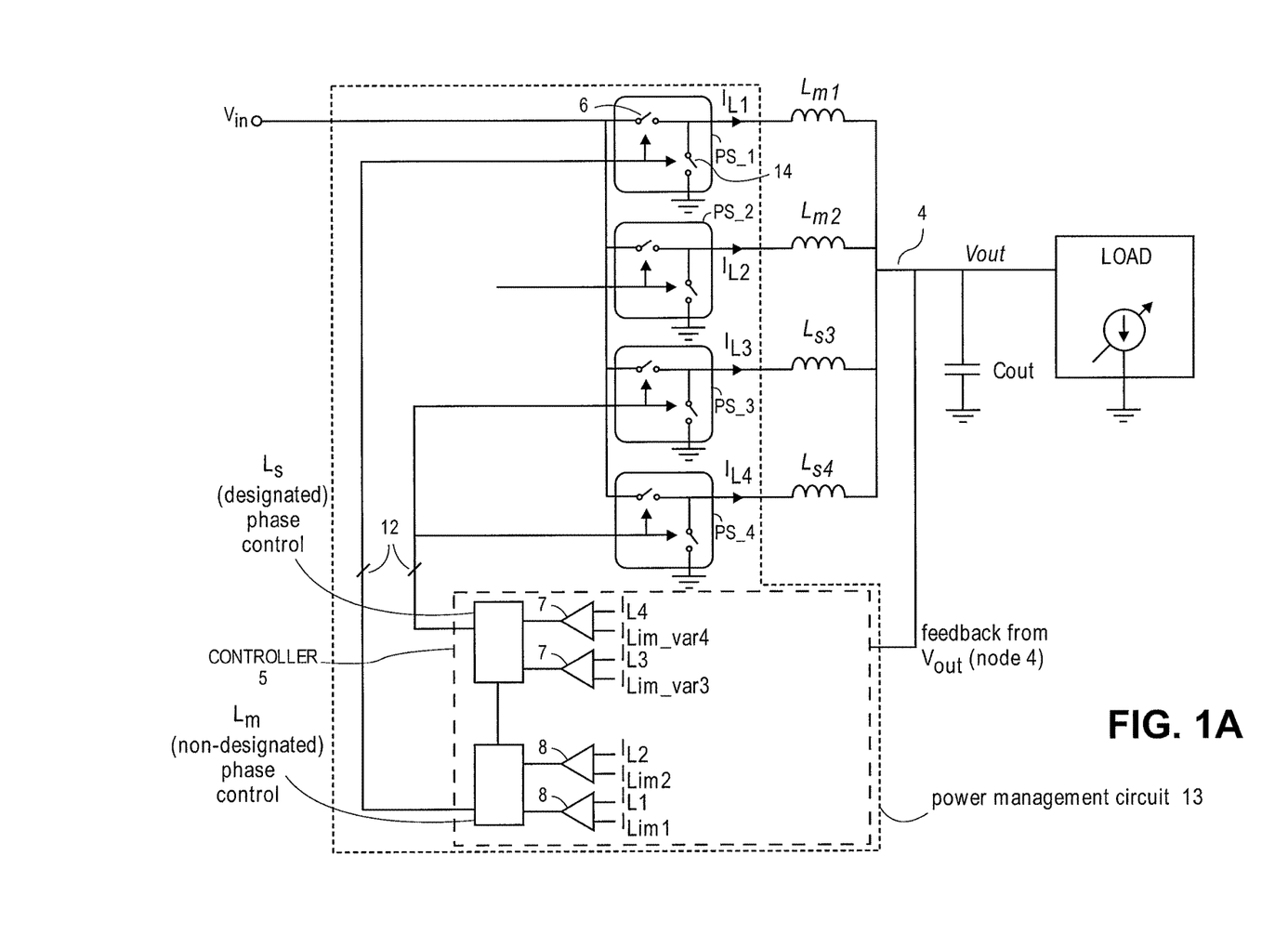
FIG. 1A is a block diagram of a switching power conversion circuit.

FIG. 1A is a block diagram combined with a circuit schematic of a switching power conversion circuit, in accordance with an embodiment of the invention. The conversion circuit produces a regulated output voltage, $V_{out}$, by converting power from an input port that in this embodiment is at a dc input voltage, $V_{in}$. In one embodiment, the input voltage is obtained from a rechargeable battery or from an external power adapter when plugged in, as in a portable electronic device (see FIG. 5). It should, however, be noted that the various embodiments of the invention described here could also be used with non-portable devices, including, for example, desktop computers and other consumer electronic devices that present demanding input voltage and load conditions upon a power converter. The switching power conversion circuit shown has a number of phases, in this case four, where each phase has an inductor $L_m$ or $L_s$ that is coupled to a power switch circuit, ps, at one end and to an output node 4 at another end. Each power switch ps may have a number of power stage transistor switch circuits 6, 14 (that are depicted here by switch symbols). When switch circuit 6 is open and switch circuit 14 is closed, the phase current $I_L$ recirculates from ground; when switch circuit 6 is closed and switch circuit 14 is open, the phase current $I_L$ is sourced from the $V_{in}$ input node; when both switch circuits 6, 14 are open, the phase current $I_L$ is completely switched off. The switches 6, 14 may also be operated to act as a charge pump. The phases are coupled to feed their currents to the output node 4 having voltage $V_{out}$ as shown, where the output node may also have a filter or ripple control capacitor $C_{out}$. A load is connected to the output node 4, where this load can be viewed as a variable current sink.

The switching power conversion circuit also has a power conversion controller 5 that is coupled to control the switching of one or more of the phases, in this example four phases are shown, in order to yield a regulated voltage $V_{out}$ on the output node 4. The controller 4, also referred to as a switch mode controller, may operate in accordance with any one of different switch mode power converter topologies, although in this embodiment, the controller 5, power switch circuits ps and inductors $L_m$, $L_s$ are configured in accordance with a buck converter topology. Alternatives include a boost converter topology where $V_{out}$ is regulated to a higher voltage than $V_{in}$. The buck converter is an example of a step-down converter in which the output voltage $V_{out}$ is lower than $V_{in}$, where both the input and output voltages are dc voltages. The controller 5 has $L_s$ phase control logic and $L_m$ phase control logic that generate the appropriate transistor pulse control signals at its phase control outputs 12 (a set of one or more control signals for each phase, as shown). These will have the appropriate amplitude swing and timing, and are applied to control the power switches ps in each phase, so as to switch them on and off according to a closed loop control algorithm that obtains feedback of the output voltage $V_{out}$. Regulation of $V_{out}$ is thus achieved under both varying $V_{in}$ and varying load. The inductor $L_m$, $L_s$ in each phase is used as an energy storage element that conducts an inductor current $I_L$ for that phase, which is being switched to rise or to fall with time, by the associated power switch circuit ps. The capacitor $C_{out}$ acts as a further energy storage element that helps smooth out a switching-induced ripple that is inherent in $V_{out}$. The load (or load current) is drawn by circuitry that may include one or more subsystems, for example those shown in FIG. 5.

The controller may be part of a power management circuit 13 that may include the power switch circuits ps on-chip with analog sensing and processing circuits, as well as digital timing and data processing circuitry of the controller 5. Of course, other power management hardware not shown in FIG. 1A such as a data communications interface for communicating with an off-chip processor may also be included.

Figure 1B:
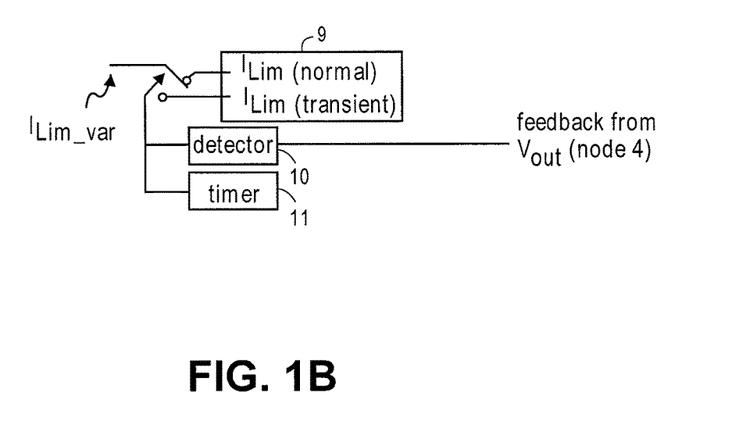
FIG. 1B is a block diagram of a variable inductor current limit circuit.

Referring to FIG. 1B, the controller 5 uses a variable inductor current limit $I_{Lim\_var}$ when controlling one or more designated phases, as depicted by the switch symbol connecting, alternately, $I_{Lim(normal)}$ and $I_{Lim(transient)}$ to a comparator 7. A designated phase is a phase that can be turned on during a transient control mode of operation of the controller 5, while its variable inductor current limit $I_{Lim\_var}$ has been raised above a "normal" level as explained below. In the example of FIG. 1A, there are four phases, two of which are "designated" and their inductors are labeled $L_s$, while the non-designated phases have inductors labeled $L_m$. A non-designated phase (having inductor $L_m$) is a phase whose inductor current limit $I_{Lim}$ may not be raised (during the transient control mode of operation) above its normal level. A non-designated phase may have a fixed inductor current limit.

In one embodiment, each designated phase ($L_s$) may have its own, separately programmable $I_{Lim\_var}$ storage element, which is used to achieve a separately controllable inductor current limit for each phase. For example, where there are two designated phases $L_{s3}$ and $L_{s4}$, phase $L_{s3}$ has $I_{Lim\_var3}$ and phase $L_{s4}$ has $I_{Lim\_var4}$—see FIG. 1B. In some cases, however, two or more designated phases ($L_s$) may be assigned the same $I_{Lim\_var}$. In general, the switching power conversion circuit may have as few as only one designated phase ($L_s$), and one or more non-designated phases ($L_m$).

An inductor current limit $I_{Lim}$ may protect a switching power transistor of the power switch circuit ps, or the inductor $L_s$, $L_m$, of a phase, and also to meet a maximum dc load requirement of the power conversion circuit. During a normal mode of operation, the standard or normal limit (which may be the same for all of the phases, or may be different for some of the phases) may be designed to be the total dc load divided by the number of phases feeding the load, to meet an optimum efficiency load line. For some of the phases however, namely the "designated" phases, a variable inductor current limit $I_{Lim\_var}$ is used, which as described below becomes skewed or different from its normal level during a transient condition.

In one implementation, referring back to FIG. 1A, a comparator 7 may compare a measure of the present inductor current $I_{Li}$ where i=1, 2, . . . to a programmed, variable inductor current limit $I_{Lim\_var}$ of a designated phase ($L_s$). Another comparator 8 may compare a measure of the present inductor current $I_{Li}$ to a programmed, fixed inductor current limit $I_{Lim}$. In other words, each designated phase may have an associated comparator 7, while each non-designated phase may have a comparator 8, to perform a comparison against a measure of its respective phase current $I_{L1}$, $I_{L2}$, . . . . Any suitable technique for obtaining the measures of $I_{L1}$, $I_{L2}$, . . . can be used from amongst those that are available, e.g. series sense resistor, power transistor $R_{DS(on)}$, and inductor voltage integration. On that basis, each of the comparators 7, 8 may determine or signal how to control the timing, for example duty cycle, of the control signals that are applied to the power switch circuits ps of the one or more designated and non-designated phases. The phase control signals (power switch ps control signals) are produced by the $L_s$, $L_m$ phase control logic in response to the $I_{Lim\_var}$, $I_{Lim}$ comparisons, respectively. Depending on the output node 4 ($V_{out}$) regulation error and inductor current ($I_{L1}$, $I_{L2}$, . . . ) states, various control strategies may be implemented, such as voltage mode control, current mode control, fixed on/off time control and non-linear control, to determine the duty cycle of the control signals that are applied to the power switch circuits ps of the phases. As shown in FIG. 1B, the controller 5 may have a storage element 9 (such as a register) that contains a programmable binary value that is indicative of the present inductor limit for a designated phase. The variable inductor current limit $I_{Lim\_var}$ may for example have two pre-programmed limits or values, such as a standard limit $I_{Lim(normal)}$ (for use during normal operation mode) and a raised limit $I_{Lim(transient)}$ (for use during transient control mode).

In one embodiment, the inductor $L_s$ of a designated phase, which is to be controlled in accordance with a variable inductor current limit $I_{Lim\_var}$, has smaller inductance and higher saturation current than the inductor $L_m$ of a non-designated phase. An intention here is to take advantage of a smaller inductance, which may have higher saturation current and hence may be driven harder during a transient situation. Thus, in FIG. 1A, $L_s$ may have a smaller inductance and higher saturation current than $L_m$. Just as an example, $L_m$ may have an inductance that is greater than that of $L_s$ by at least a factor of four, although in general this may be different in view of the particular power supply application. Indeed, during the design of the inductor $L_s$, its inductance and saturation current may be selected in view of the inductance of $L_m$ so as to improve the overall transient response of the power conversion circuit.

Still referring to FIG. 1B, the power conversion circuit may have a detector circuit 10 that is to detect the change in the load on the output node 4, for example, by detecting a sufficient and sudden drop in $V_{out}$ through, for example, a voltage feedback path as shown. The detector circuit 10 may assert a control signal upon such detection. The controller 5 responds to this detection by increasing the variable inductor current limit $I_{Lim\_var}$ of one or more designated phases (e.g., $L_{s3}$, $L_{s4}$).

The controller 5 may also include a timer 11 that is started in response to the detection of a change in the load. The controller 5 then responds when the timer 11 expires, by decreasing $I_{Lim\_var}$ (e.g., switching from $I_{Lim(transient)}$ back down to its standard or normal value $I_{Lim(normal)}$). If the timer 11 is used, its length may be programmable and could be set depending on the severity of the detected transient voltage drop or load change.

In another embodiment, different timers 11 may be provided, so that two or more designated phases have different time out intervals. In other words, $L_{s3}$ may have a first, programmable time-out interval, and $L_{s4}$ may have a second, programmable time-out interval. As an alternative to the use of the timer 11, a further detector circuit (not shown) may determine that the transient condition has passed, by, for example, detecting that the output voltage $V_{out}$ has settled, e.g. remains within a normal regulation range, after its transient drop (see the $V_{out}$ curves in FIG. 2, described below). In response, $I_{Lim\_var}$ is decreased back to its normal level $I_{Lim(normal)}$.

Figure 2:
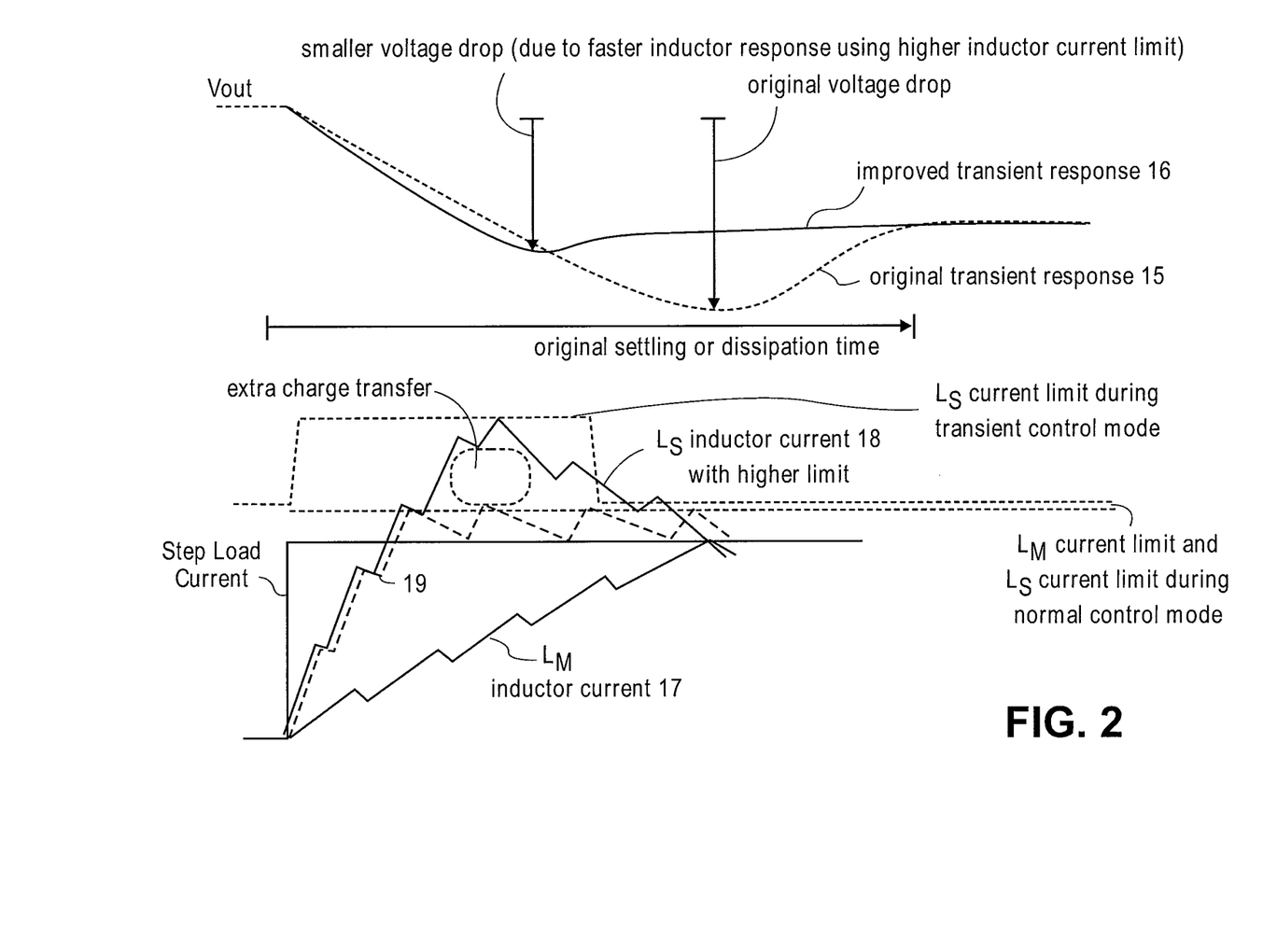
FIG. 2 illustrates waveforms of output voltage, load current, and inductor currents.

In one embodiment, the raised value $I_{Lim(transient)}$ of the variable inductor limit $I_{Lim\_var}$ is a saturation current level of the inductor $L_s$ of one or more designated phases. This temporary increase may be performed for all designated (smaller inductance) phases of the power conversion circuit at the same time, and may be combined with switching on simultaneously all of the designated phases, during a transient control mode of operation of the controller 5. Optionally, one or more of the other phases ($L_m$) may also be turned on, to help minimize the sag exhibited by the output node voltage $V_{out}$ (during the transient). FIG. 2 can be used to illustrate the advantageous result of a smaller $V_{out}$ drop that may be achieved using an embodiment of the invention.

FIG. 2 illustrates relevant current and voltage waveforms of an example situation in which the power conversion circuit is responding to a sudden change in load (or a step load current in this case), which results in $V_{out}$ exhibiting a transient drop as shown. For simplicity, only waveforms relating to a single designated phase and a single non-designated phase are shown, it being understood that there may be more than two phases in total. An original transient response curve 15 ($V_{out}$) is shown that may be expected in the case where the inductor current limits of all phases are maintained at a standard or normal limit during a transient drop. It can be seen that the original voltage drop in $V_{out}$ is significant (and it may depend on the amplitude of the step load current, among other factors). It can also be seen that the original transient response curve 15 exhibits a relatively long settling or dissipation time. This is in contrast to an improved transient response curve 16, which may be obtained by configuring the power conversion controller in accordance with an embodiment of the invention to cause a rapid increase in the designated phase ($L_s$) inductor currents that are feeding the output node.

Still referring to FIG. 2, a difference in the behavior of the inductor currents between that of a designated phase $L_s$ and a non-designated phase $L_m$ is also shown, wherein the $L_m$ inductor current curve 17 rises much more slowly then the $L_s$ inductor current 18 due to the smaller inductance of $L_s$. In accordance with an embodiment of the invention, a distinct improvement in the transient response may be achieved by increasing the area under the $L_s$ current curve 18 relative to when a lower, standard or normal current limit is applied—see curve 19. This translates to a greater amount of charge being transferred from $V_{in}$ to the output node 4 (see FIG. 1A), by increasing the inductor current limit of a designated one or more of the phases $L_s$ when changing from a normal control mode to a transient control mode. This additional charge transfer, that is due to the increased $L_s$ current limit being applied during transient control mode, may result in a smaller voltage drop in $V_{out}$ as shown in the improved transient response curve 16, due to the faster ramp-up of the $L_s$ inductor current 18, by virtue of the higher inductor current limit being in place. In other words, improving the slew rate together with the peak amplitude of the inductor current, in a designated one or more of the phases $L_s$, may significantly reduce the voltage drop during a transient condition. Once the voltage drop transient has passed (where as seen in FIG. 2 this will advantageously occur sooner than the settling time of the original transient response 15), the $L_s$ current limit is lowered back to its normal control mode level.

In one embodiment, the higher inductor current limit during transient control mode is set at or just below the saturation current of $L_s$. Increasing the current limit above the saturation current of the inductor may result in less efficient performance, due to a significant drop in inductance that is typically exhibited above the saturation current level. As to the relationship between the increased current limit and the normal current limit for a designated phase $L_s$, this relationship may be explored, for example, using empirical testing and simulations, in view of possible trade offs such as dc resistance of the inductor $L_s$ and the maximum available switching frequency of the power switch circuits ps of the designated phases. Just as an example, an increased current limit may be programmed to be at least 20% higher than the normal limit (of a given designated phase). In addition, in most instances, it is expected that the increased $L_s$ current limit of one or more designated phases will also be higher than the $L_m$ current limit of the non-designated phases that also have larger phase inductance, and the exact proportion there between can be determined using laboratory experimentation. In one embodiment, to achieve the greatest utilization of the non-designated or larger inductance phases, the $L_m$ current limit for each such phase should be set to at or just below the saturation current level of the inductor $L_m$.

Figure 3:
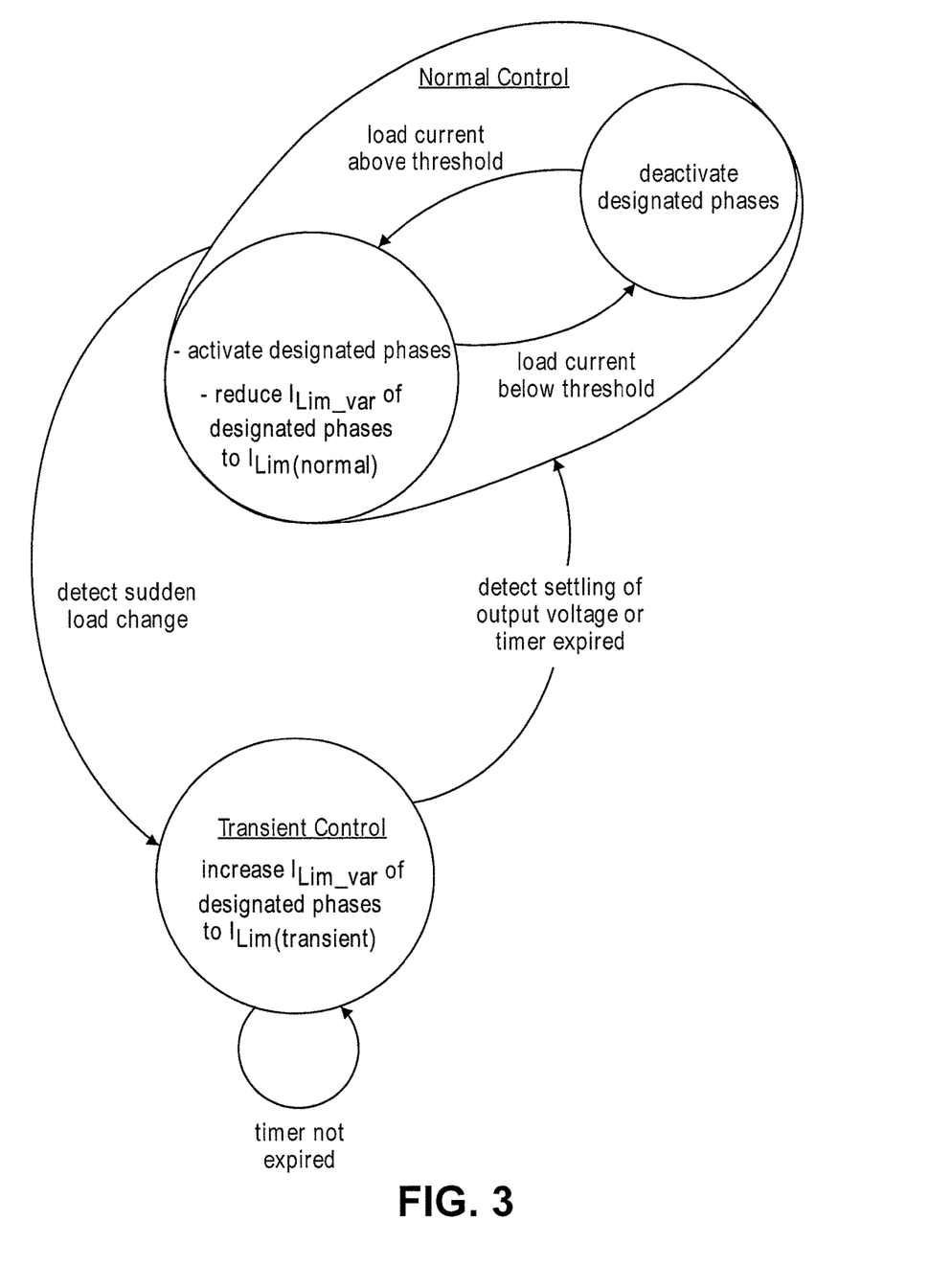
FIG. 3 is a state diagram of a switching voltage regulator controller.

Referring now to FIG. 3, this is a state diagram of an example implementation of the controller, in connection with its normal and transient control modes of operation. The state diagram may be implemented by a hardwired state machine or by an equivalent programmed processor implementation, for example as part of a power management circuit. Operation may begin in a Normal Control state or mode in which the inductor current limit $I_{Lim\_var}$ of the designated phases $L_s$ has been reduced to its standard or normal level. The designated phases are active in that they may be used by the controller to assist in voltage regulation of the output node, that is their inductor currents can be switched so as to regulate the output voltage.

In one embodiment, and as depicted in the Normal Control state of FIG. 3, the designated phases $L_s$ are active only if the load current is above a given threshold; if the load current is below the threshold, then the designated phases $L_s$ are deactivated, that is they are not being switched to contribute to the load current (and maintain the output voltage regulation). In some embodiments, the instance where the designated phases $L_s$ have much smaller inductance than the non-designated phases $L_m$, and as such will operate less efficiently than the larger inductance phases $L_m$ during light load conditions, making it more efficient to rely on the non-designated phases $L_m$ only, to deliver the entire load current and maintain $V_{out}$ regulation. The designated phases may remain inactive until the load on the output node (as detected) exceeds a threshold. Alternatively, the designated phases may be activated in response to the controller exiting a pulse frequency modulation (PFM) mode of operation, which typically occurs when the load is expected to reach, or has increased to, a substantially higher level.

Still referring to FIG. 3, in the Normal Control state or mode, and where the designated phases may be either active or inactive, the controller may detect a sudden load change that is significant enough to be considered a transient event, rather than normal regulation voltage ripple. This detection, as was suggested above, may be achieved using a detection circuit that can detect, for example, a sufficiently large and rapid drop in the output node voltage. The controller responds by changing from the Normal Control mode to its Transient Control state or mode, as shown in FIG. 3, in which the inductor current limit $I_{Lim\_var}$ of the one or more designated phases is increased. The increase in $I_{Lim\_var}$ helps increase the amount of charge that is supplied to meet the increased load, thereby helping reduce the transient voltage drop on the output node. In one embodiment, all designated phases $L_s$ are simultaneously activated in the Transient Control mode, in addition to some or all of the other or non-designated phases $L_m$, so as to obtain the fastest transient response.

Still referring to FIG. 3, the controller will transition from the Transient Control mode back to the Normal Control mode when the transient event has passed. This may be triggered by, for example, having detected the settling of the output voltage back down into a normal ripple range, or a timer having expired (where the timer was started in response to the initial detection of the sudden load change).

Returning to normal control mode means that the current limit $I_{Lim\_var}$ of the designated phases is reduced back to a level that is below the saturation current of the inductor $L_s$ of each designated phase.

Figure 4:
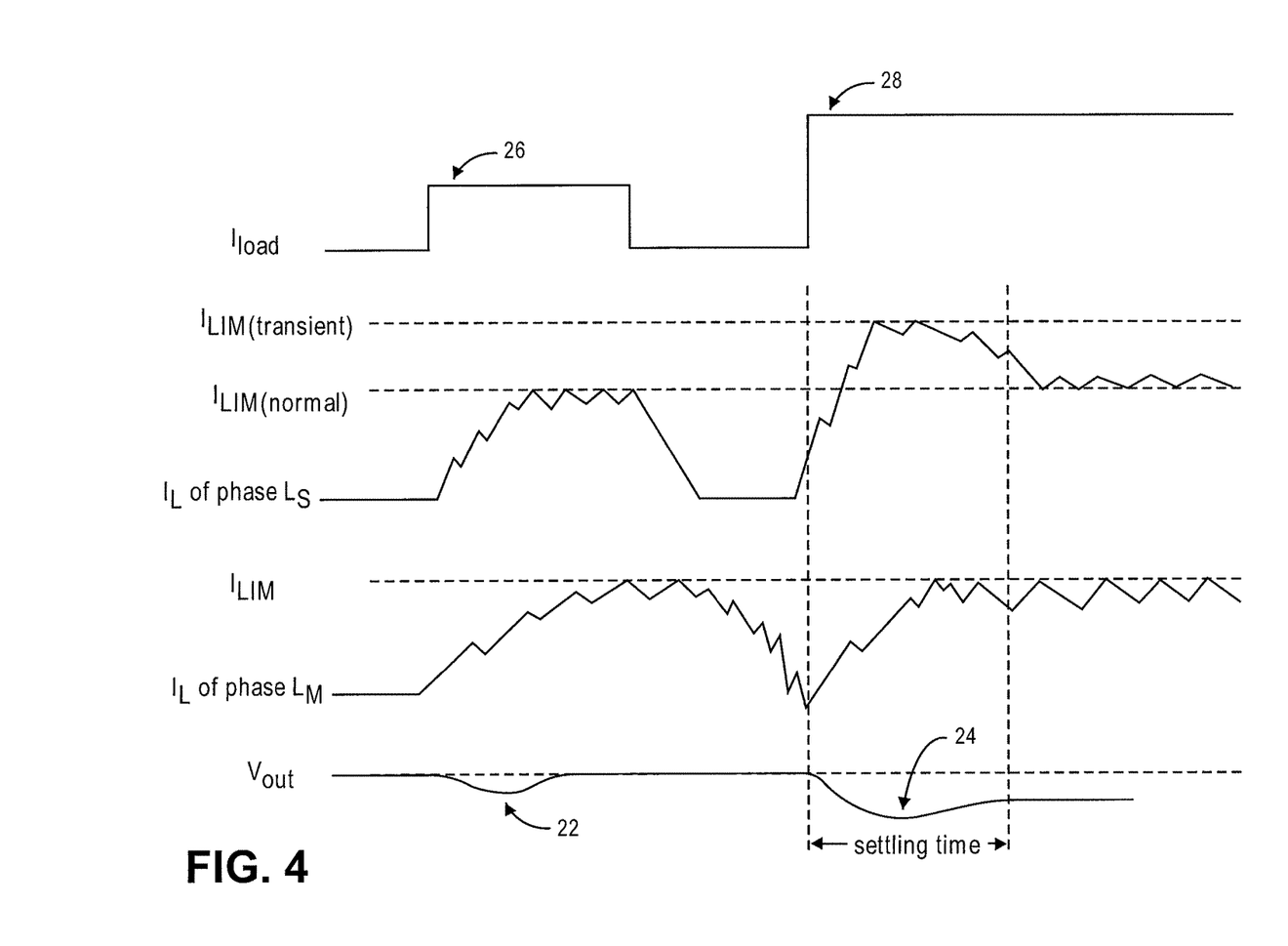
FIG. 4 shows current and voltage waveforms relevant to a switching power conversion circuit.

A method for providing a regulated voltage with improved transient response may be described using the following process operations, and in connection with the timing diagram of FIG. 4. The method below may be performed by electronic hardware that was described above, such as shown in FIG. 1A, or other suitable electronic hardware that can perform switching control of a number of phase currents that are feeding an output node, while the output node exhibits a regulated voltage. Referring to FIG. 4, the output voltage $V_{out}$ is shown versus time, where there are two transient events that occur, the first transient event 22 being caused by a relatively light load change and the second transient event 24 being caused by a relatively heavy load change. The load current $I_{load}$ that may cause such transients is shown generically as a step load. In practice, of course, the load current may be different but may be approximated to a first order by a step function. The inductor currents $I_L$ of two phases are shown, namely a non-designated phase $L_m$ and a designated phase $L_s$, where the latter has a smaller inductance than $L_m$. A current limit $I_{Lim}$ is also shown as being associated with each phase current, where it is clear that $I_{Lim}$ is variable for the designated phase $L_s$, and is to vary between a lower, normal setting $I_{Lim(normal)}$ and a higher, transient setting $I_{Lim(transient)}$. In contrast, the inductor current limit $I_{Lim}$ for the phase $L_m$ may, in one embodiment, remain fixed. Switching control is depicted by the resulting jagged shape (somewhat resembling a saw tooth or asymmetric triangular waveform) of the phase currents $I_L$ as shown. It can be seen that during a first load step 26, the current $I_L$ of a designated phase $L_s$ remains below its normal limit, as does the current for the non-designated phase $L_m$. This may be due to the load step 26 not being severe enough to trigger the need for a higher inductor current limit in the designated phase.

After the first load step 26 has ended, the currents in both phases will gradually drop and may even reach zero in the case of phase $L_s$, where it may be assumed in this case that the load current has dropped below a threshold such that the phase $L_s$ is deactivated, while phase $L_m$ remains active. Next, a second load step 28, which is larger step than the first load step 28, is encountered which results in a transient voltage drop in $V_{out}$ as shown (second transient event 24). Switching control continues under these circumstances, but in this instance the phase current of $L_s$ goes above its normal limit and reaches a higher limit $I_{Lim(transient)}$. The non-designated phase $L_m$ continues to be switched during the second transient event 24 but remains below its normal current limit.

As suggested above, the change in load may be detected using, for example, an output voltage drop detection circuit, in response to which the designated phase $L_s$ is allowed to temporarily reach the higher limit (which may have been set in an $I_{Lim\_var}$ register of the controller). As an example, this higher limit may be at least 20% greater than the normal limit, although in practice this may be different depending on the application. This increase in the current limit is temporary in that once the transient voltage drop has passed or dissipated, the designated phase current drops to, at or below, its normal limit as shown. As suggested above, a trigger that reduces the current limit of the designated phase $L_s$ may be the expiration of a timer, e.g. a timer that is on the order of a few microseconds, for example, or other suitably short interval selected in view of experimental results or simulations of a typical transient response behavior.

In the embodiment of FIG. 4, it should be noted that the load current at the second step 28 is much higher than the load current at the first step 26, such that the designated phase $L_s$ will remain active even after the transient has passed, so as to assist the non-designated phase $L_m$ in regulating the output voltage, for example during pulse width modulation (PWM) mode control of the phases. Here it should be noted that the switching frequency of the designated phase $L_s$ may be different, and likely higher, than the switching frequency of the non-designated phase $L_m$. Studies show that the percentage improvement in a reduction of the voltage drop during a transient, utilizing the above-described concept of having different phase current limits with small and large inductors in the appropriate phases, can be as high as 50%.

Figure 5:
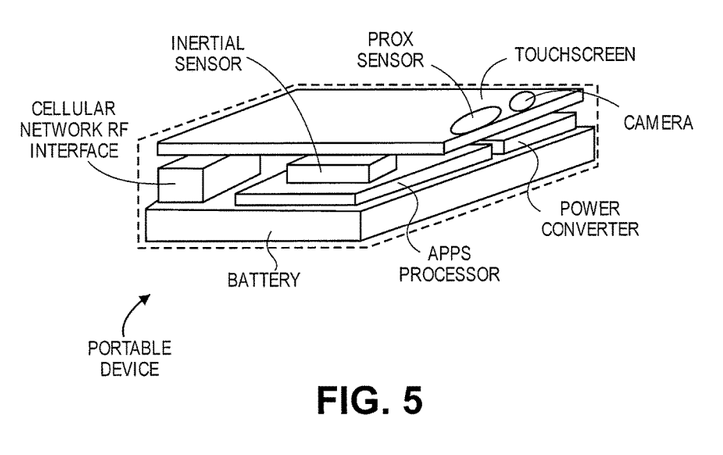
FIG. 5 is a block diagram of an example portable device in which a switching power conversion circuit can be used.

FIG. 5 shows an example portable electronic device in which an embodiment of the invention may be implemented. While some of the benefits of the invention are more apparent in such power consumption-sensitive devices, due to the tighter tolerance on transient voltage drop of a power supply voltage, an embodiment of the invention may also find use in non-portable electronic devices, such as desktop computers. The portable device shown has an external or outer housing (shown in dotted lines) in which are installed a number of its constituent sub-systems including, in this example, an applications processor, a cellular network RF interface, a digital camera, a touch screen, a proximity sensor and an inertial sensor. These sub-systems may be found in a typical smart phone or tablet computer that also contains a rechargeable battery to power all of the sub-systems shown. In other portable devices, some of these sub-systems may, of course, be absent. One or more of such sub-systems may be connected to be powered by an output node of a power conversion circuit as described above. The power conversion circuit may be one or more dc-dc voltage regulating down converters (or boost converters), that are connected in parallel to the same output node and are also installed in the housing of the portable device, to provide a regulated dc supply voltage to one or more connected sub-systems. An embodiment of the invention automatically and temporarily increases the inductor current limit of one or more designated phases of the power conversion circuit, so as to help reduce transient voltage drop on the output node that may be caused by a sudden and significant increase in activity of one or more of the connected subsystems.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while FIG. 1A depicts a buck converter having a synchronous topology where each phase has both high side and low side power switches ps, an alternative is to replace the low side power switches by an active device such as a diode, also referred to as a recirculating diode. In yet another embodiment, the power switch circuit ps of each phase may use other active devices, that is not transistors but, for example, a semiconductor controlled rectifier (SCR) or thyristor. Also, while FIG. 1A and FIG. 1B suggest that the load detector 10 may be associated with a single controller 5, the detector 10 may also be used to, at the same time, signal another controller of another power converter (not shown) that is connected to the same output node 4 in parallel, to change its mode of operation from normal control to transient control. Thus, there may be several converters, each with its own separate controller, that are connected to the output node 4 in parallel, where each converter may have a respective instance of the controller 5 configured to respond to the transient detection signal from the detector 10, by activating its one or more designated phases (generally in the manner described above) to alleviate the transient drop. A designated phase in that case could be that of a single-phase converter which is connected in parallel with a multi-phase controller. The description is thus to be regarded as illustrative instead of limiting.

What is claimed is:

1. A switching power conversion circuit comprising:
a plurality of phases, wherein each of the phases has an inductor coupled to a power switch circuit, the plurality of phases each being coupled to an output node; and
a power conversion controller coupled to control switching of one or more of the phases to yield a regulated voltage on the output node, and wherein the controller uses a variable inductor current limit for a designated one or more, not all, of the phases and temporarily increases the variable inductor current limit for the designated one or more of the phases during a transient condition;
wherein the designated phase remains inactive while all others of the plurality of phases are active to provide the regulated voltage on the output node, until a) a load on the output node exceeds a threshold, or b) the controller exits a pulse frequency modulation (PFM) mode of operation.

2. The power conversion circuit of claim 1 wherein the inductor of the designated one or more of the phases that is controlled in accordance with the variable inductor current limit has smaller inductance and higher saturation current than the inductor of another one of the phases.

3. The power conversion circuit of claim 2 wherein the inductor of said another one of the phases has greater inductance than that of the inductor of the designated one or more of the phases that is controlled in accordance with the variable inductor current limit, by at least a factor of four.

4. The power conversion circuit of claim 1 wherein the controller controls switching of said designated one or more of the phases to yield the regulated voltage in such a way that inductor current of said designated one or more of the phases does not exceed the variable inductor current limit.

5. The power conversion circuit of claim 1 wherein the controller comprises a detector circuit that detects a change in a load on the output node, the controller responds to the detection by increasing the variable inductor current limit to a transient operating mode limit.

6. The power conversion circuit of claim 5 wherein the controller comprises a timer that is started in response to the detection, the controller responds when the timer expires, by decreasing the variable inductor current limit to a normal operating mode limit.

7. The power conversion circuit of claim 1 wherein the plurality of phases are all part of a single-controller multi-phase power converter.

8. The power conversion circuit of claim 1 wherein the controller increases the variable inductor current limit to a saturation current level of the inductor of said designated one or more of the phases, when voltage of the output node drops because of a load change, and then decreases the variable inductor current limit to less than the saturation current level when the voltage has settled.

9. A power management circuit comprising:
a switching voltage regulator controller having a plurality of phase control outputs, the controller to operate in a normal control mode to yield a regulated voltage on an output node associated with the phase control outputs,
the controller increases an inductor current limit of a predetermined one or more, not all, of the phases when changing from the normal control mode to a transient control mode so that said predetermined one or more of the phases has a different inductor current limit than that of another one of the phases;
wherein the predetermined one or more phases remain inactive while other phases are active to provide the regulated voltage on the output node, until a) a load on the output node exceeds a threshold, or b) the controller exits a pulse frequency modulation (PFM) mode of operation.

10. The power management circuit of claim 9 wherein the controller comprises a detector circuit that uses a threshold to detect a change in a load on the output node, the controller responds to the detection by changing from the normal control mode to the transient control mode.

11. The power management circuit of claim 10 wherein the controller comprises a timer that is started in response to the detection, wherein the controller responds when the timer stops by changing from the transient control mode back to the normal control mode, and wherein the controller decreases the inductor current limit when changing from the transient control mode back to the normal control mode.

12. The power management circuit of claim 9 wherein the controller decreases the inductor current limit of said predetermined one or more of the phases when changing from the transient control mode to the normal control mode.

13. The power management circuit of claim 12 wherein the controller increases the inductor current limit of said predetermined one or more of the phases to be higher than an inductor current limit of another one of the phases.

14. The power management circuit of claim 9 wherein the controller comprises storage that contains a programmable value which is indicative of the increased inductor current limit.

15. A method for providing a regulated voltage, comprising:
performing switching control of a plurality of phase currents that are feeding an output node, while the output node exhibits a regulated voltage and a predetermined one of the phase currents remains at or below its normal limit; and
performing switching control of the plurality of phase currents, while a) the output node exhibits a transient voltage drop due to a load change and, simultaneously, b) said predetermined one of the phase currents goes above its normal limit;
wherein the predetermined one of the phase currents remains inactive while all others of the plurality of phase currents are active to provide the regulated voltage on the output node, until a) a load on the output node exceeds a threshold, or b) the controller exits a pulse frequency modulation (PFM) mode of operation.

16. The method of claim 15 further comprising:
detecting the load change and in response allowing said predetermined one of the phase currents to temporarily reach a higher limit, and when the transient voltage drop has dissipated the predetermined one of the phase currents drops back to its normal limit.

17. The method of claim 16 wherein the higher limit is at least twenty percent greater than the normal limit.

18. The method of claim 15 wherein while the output node exhibits the transient voltage drop, another one of the phase currents remains at or below its normal limit.

19. A battery powered portable electronic device comprising:
a housing having installed therein
a data processor having a power supply input;
a battery; and
a dc-dc multi-phase switching power converter having an input coupled to the battery, an output coupled to the power supply input of the data processor, a plurality of phases of which at least one is a designated phase that has lower inductance and higher inductor saturation current than another one of the phases, and a switch mode power conversion controller having a variable inductor current limit for the designated phase, wherein the controller temporarily raises the variable inductor current limit for the designated phase, during a transient voltage drop at the output, and then lowers the variable inductor current limit once the transient voltage drop has passed;
wherein the at least one designated phase remains inactive while all others of the plurality of phases are active to provide a regulated voltage at the output, until a) a load at the output node exceeds a threshold, or b) the controller exits a pulse frequency modulation (PFM) mode of operation.

20. The device of claim 19 wherein the controller does not change a current limit for said another one of the phases during the transient voltage drop and once the transient voltage drop has passed.

21. The device of claim 20 wherein the designated phase remains inactive while a load on the output is smaller than a threshold, and is activated only when the load is greater than the threshold.

* * * * *